United States Patent [19]

Woolley

[11] Patent Number: 4,532,803
[45] Date of Patent: Aug. 6, 1985

[54] NON-SPINNING DYNAMIC BALANCING MACHINE AND METHOD

[75] Inventor: Richard P. Woolley, Boulder, Colo.

[73] Assignee: Ball Corporation, Muncie, Ind.

[21] Appl. No.: 569,486

[22] Filed: Jan. 9, 1984

[51] Int. Cl.³ ............................................. G01M 1/16
[52] U.S. Cl. ..................................................... 73/471
[58] Field of Search ............................ 73/66, 462, 471

[56] References Cited

FOREIGN PATENT DOCUMENTS

| 33313 | 8/1971 | Japan | 73/462 |
|---|---|---|---|
| 22526 | 2/1982 | Japan | 73/462 |
| 313111 | 10/1971 | U.S.S.R. | 73/462 |
| 439713 | 1/1975 | U.S.S.R. | 73/462 |
| 564556 | 7/1977 | U.S.S.R. | 73/462 |
| 601587 | 4/1978 | U.S.S.R. | 73/462 |
| 712708 | 1/1980 | U.S.S.R. | 73/462 |

*Primary Examiner*—Stewart J. Levy
*Assistant Examiner*—John E. Chapman, Jr.
*Attorney, Agent, or Firm*—Gilbert E. Alberding

[57] ABSTRACT

Balancing an object with an irregular shape capable of generating substantial aerodynamic forces may be accomplished at atmospheric pressure by angularly oscillating the object about a vertical axis, measuring the horizontal reaction torques and forces, and calculating the imbalances in the object. Apparatus for such a method includes an object-supporting table, means for angularly oscillating the table relative to a cradle, and struts coupling the cradle to a base such that any imbalance in the object will result in reaction torques and forces being exerted by the cradle. Transducers detect these reaction torques and forces. A circuit processes the output of the transducers to provide signals representing those detected forces which are a component of a sinusoid at the frequency of oscillation that is in phase with the angular acceleration of the table. Such signals provide a measure of the imbalance of the object. The invention is especially useful in balancing objects having unusual non-symmetrical shapes or protrusions, such as spacecraft, where conventional spin balancers are not effective because of effects caused by aerodynamic forces.

13 Claims, 5 Drawing Figures

NON-SPINNING DYNAMIC BALANCING MACHINE AND METHOD

BACKGROUND OF THE INVENTION

The present invention relates generally to a method and apparatus for balancing an object. More particularly, the invention relates to a method and apparatus in which effects due to both static and dynamic imbalance are excited by a small angular oscillation rather than by spin as in conventional balancers.

Conventional balancing machines excite effects due to static and dynamic imbalance in an object by spinning it and detecting those effects by various means. Typically, the balancer spins the object about a vertical axis and deduces the imbalance by detecting the resulting horizontal reaction forces and torques. By knowing these forces, and torques, one can readily determine the adjustments needed to correct the balance of the balance.

Because the reactions due to imbalance are proportional to the square of the spin rate, the signal-to-noise ratio tends to be low at low spin rates. Accordingly, it is usually desirable to maintain a fairly high spin rate to reduce the effects of the measurement noises. This works quite well when the object being tested is relatively smooth and symmetrical; but on irregular-shaped objects, such as on the new breed of shuttle-launched spacecraft with their unusual angular shapes and oddly placed solar cell paddles, aerodynamic forces cause effects which are indistinguishable from those caused by the imbalance and which cannot be eliminated by simply increasing the rate of spin. This is because windage noise is also proportional to the square of the spin rate; and as the spin rate is increased, these oddly shaped objects create so much wind noise that the precision of the balancing process is totally destroyed.

In order to overcome this serious problem, one practice utilized in the prior art has been to perform the balancing operations inside a vacuum chamber. Although this does circumvent the problem, it also significantly increases the cost of the balancing process. The balancing could also be done with the paddles removed from the spacecraft to reduce the effects due to aerodynamic forces, or the balancer could be placed within a spinning shroud where the surrounding air will move with the spacecraft. If desired, the balancing could even be done after the spacecraft is in orbit. All of these approaches, however, have a number of drawbacks, some of which are readily apparent, others of which are more obscure. What is really needed is a balancing machine that can balance oddly shaped objects in an ordinary room without significant aerodynamic interference.

SUMMARY OF THE INVENTION

In accordance with the present invention a new "wiggle balancer" is provided which excites effects due to imbalance in an object by subjecting it to an angular oscillation, and then detecting those effects by means of phase-sensitive detectors. By using a small-angle oscillation instead of a continuous spin, the windage noise of the balancer is reduced relative to a conventional spin balancer by a factor of about one hundred! Thus, the invention renders aerodynamic noises innocuous to such a degree that even such difficult objects as spacecraft with oddly placed, solar-cell paddles can be accurately balanced in an ordinary air-filled room.

In accordance with a presently preferred embodiment of the invention, the object to be balanced is carried on a table, which, in turn, is coupled to a supporting cradle by a torsion rod sized to tune the oscillation of the test object to a chosen frequency (preferably between about 0.2 and 1.0 hz). Pneumatic cylinders are provided to drive the table and the test object into oscillation about the vertical axis at the desired amplitude (preferably between about 0.01 and 0.06 radian).

The cradle is supported on a base by an arrangement of six struts each of which is very stiff along its length and relatively soft sideways. Two of the struts, termed columns, are positioned to hold the cradle stiffly against translation in the direction of the vertical axis and against rotation about a first horizontal axis, while another pair of struts, termed braces, hold it stiffly against translation in the direction of the second horizontal axis and against rotation about the vertical axis. Finally, the third pair of struts, the links, hold the cradle stiffly against translation in the direction of the first horizontal axis and against rotation around the second horizontal axis. Thus, all six degrees of freedom of the cradle are stiffly constrained by one pair or another of the struts, but almost all of the constraint along one of the horizontal axes and around the other horizontal axis is exerted by the links which are instrumented to measure the forces they exert when the table and the object carried by it is driven into oscillation.

Specifically, each of the pair of links contains a force transducer whose output, when the table is driven into oscillation, consists of a constant term, a sinusoid at the oscillation frequency, lesser sinusoids at harmonics of the oscillation frequency, 60 and 120 hz noise and random noise. The sinusoid at the oscillation frequency has a component that is in phase with the angular acceleration of the table. In the preferred system of this invention, this in-phase angular acceleration component of the table is measured.

The oscillating table drives a velocity transducer whose output feeds zero-crossing detectors that generate timing pulses at each positive-going zero crossing of the velocity signal and at each negative-going zero crossing; that is, when the table is at the extremes of its motion and the acceleration is at its peaks. In performing a measurement, at each positive-going zero crossing, the force transducer output of one of the links is sampled, digitized, and summed into a register. At each negative-going zero crossing, the transducer output of the link is also sampled, digitized and its negative summed into the register. A display, updated once per cycle, shows the content of the register divided by the number of cycles since the start of the measurement. This sampling method, by only making measurements when the sinusoidal oscillating signal crosses the zero line, ignores the constant term, the out-of-phase component of the fundamental and all even harmonics. Thus, the display will show a running average of the peak-to-peak value of the desired component plus noise (possibly contaminated with odd harmonics). As the cycles accumulate, however, the noise will average to zero and the reading will steady.

In a similar manner, a second display will show the desired component of the force exerted on the second link.

In operating the system, a torsion rod should first be installed that will oscillate the test object at a desired frequency. The peak acceleration that goes with the desired oscillation amplitude can be calculated.

The test object should then be mounted on the table and the table should be turned to align one horizontal axis (e.g. the +X axis) of the test object with a selected horizontal axis of the cradle. Measurement is then initiated; and when the readings on the two displays have steadied, they are recorded. The table is then turned to align the second horizontal axis (e.g., the +Y axis) of the test object with the selected axis of the cradle, and a second set of readings are obtained. In a similar manner, measurements are made with the (−X) and (−Y) axis of the object aligned with the selected axis of the cradle. From these readings, the imbalance in the object can readily be calculated such that ballast can be added to the object or other adjustments made to bring the object into static and dynamic balance.

Other advantages and objects of the invention will become apparent during the following description of the presently preferred embodiment of the invention taken in conjunction with the drawings.

DETAILED DESCRIPTION OF THE PREFERRED EMBODIMENT

Figure 1:
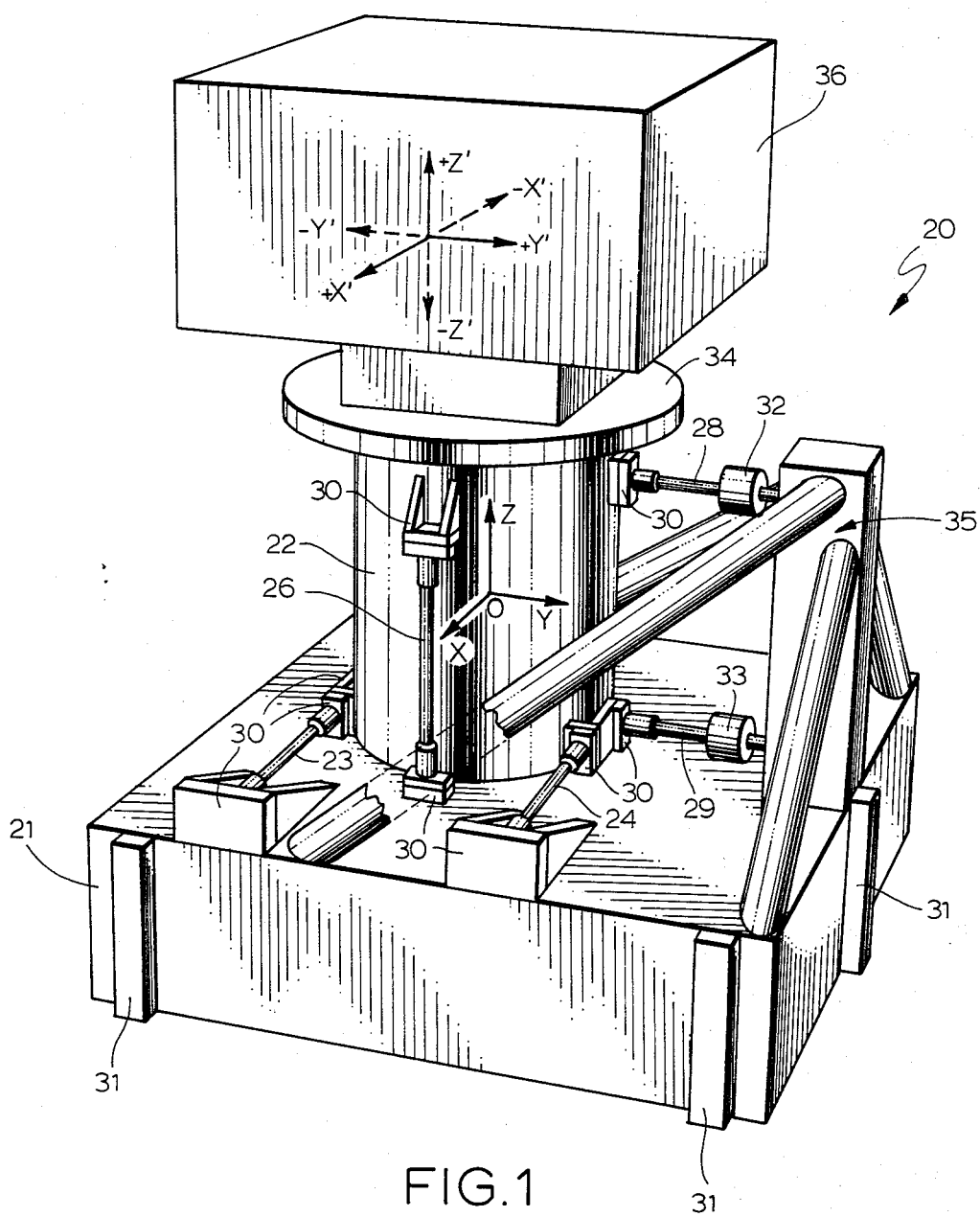
FIG. 1 schematically illustrates a balancing machine according to a presently preferred embodiment of the invention.
Figure 3:
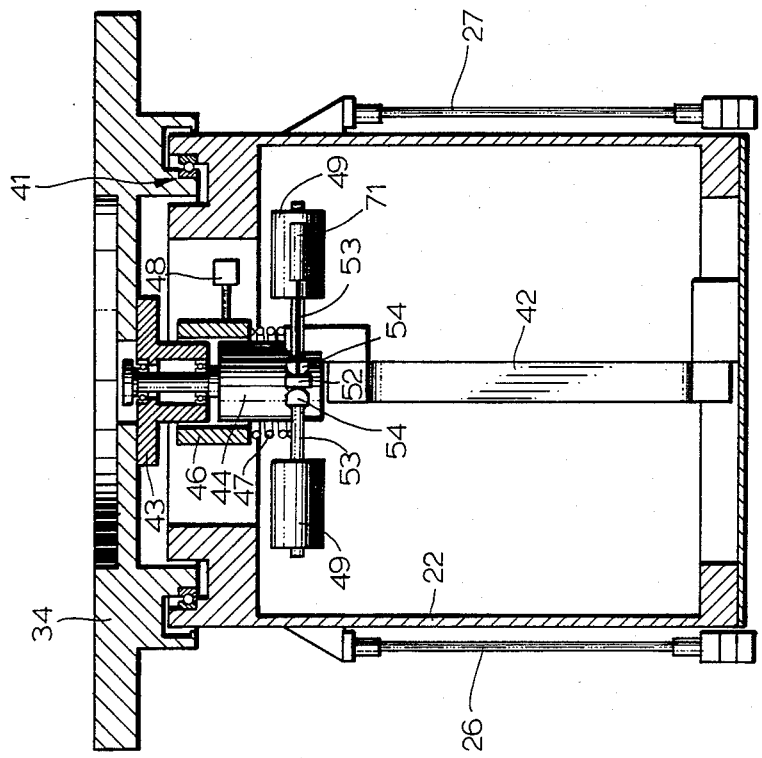
FIGS. 2 and 3 are partial cross-sectional views of the cradle and turntable illustrated in FIG. 1 cutting through the cradle and turntable in the YZ and XZ planes, respectively, in FIG. 1, to illustrate the internal structure of the cradle.

FIG. 1 schematically illustrates a balancing machine according to a presently preferred embodiment of the invention. The over-all balancer, designated by reference number 20, provides means for angularly accelerating an object about an axis (Z) and includes a base 21 supporting a cylindrical-shaped cradle 22 by means of an arrangement of six struts 23, 24, 26, 27, 28 and 29 (strut 27 is not visible in FIG. 1 as it is behind cradle 22, but is shown in FIG. 3). The six struts comprise relatively thin steel rods which are rigidly bolted to the base and to the cradle by appropriate strut support structure generally identified by reference number 30 and, as such, are extremely stiff along their length but relatively soft sideways.

Two of the struts, braces 23 and 24, are parallel to the X-axis (an XYZ coordinate system is shown in FIG. 1 which has its origin at the center of the cradle) and are spaced equidistantly on either side of the XZ plane. Thus, the braces will hold the cradle stiffly against translation in the direction of the X-axis and against rotation around the Z-axis. Struts 26 and 27, the columns, are parallel to the Z-axis; are spaced equidistantly on either side of the YZ plane; and therefore, hold the cradle stiffly against translation in the direction of the Z-axis and against rotation about the Y-axis. Finally, struts 28 and 29, the links, are positioned parallel to the Y-axis and are spaced an equal distance on opposite sides of the XY plane to hold the cradle against translation in the direction of the Y-axis and against rotation around the X-axis.

Thus, the six struts together are effective in stiffly constraining all six degrees of freedom of the cradle. As is apparent from FIG. 1, however, almost all the constraint in the direction of the Y-axis and about the X-axis is exerted by the links 28 and 29; and, as will be explained hereinafter, these two struts are instrumented to measure the forces they exert.

The base 21 can be made of any desired material and in any desired manner; however, in the preferred embodiment, which is designed to have approximately a 20,000 pound capacity, it was built up of a honeycomb structure and has a size of about 60 inches ×60 inches by about 15½ inches. Appropriate levelers 31 are preferably provided to ensure that the base sits perfectly level on the floor. A plate having a number of holes can conveniently be provided as the top of the base to permit the strut support structure to be bolted firmly in place onto the base.

Figure 4:
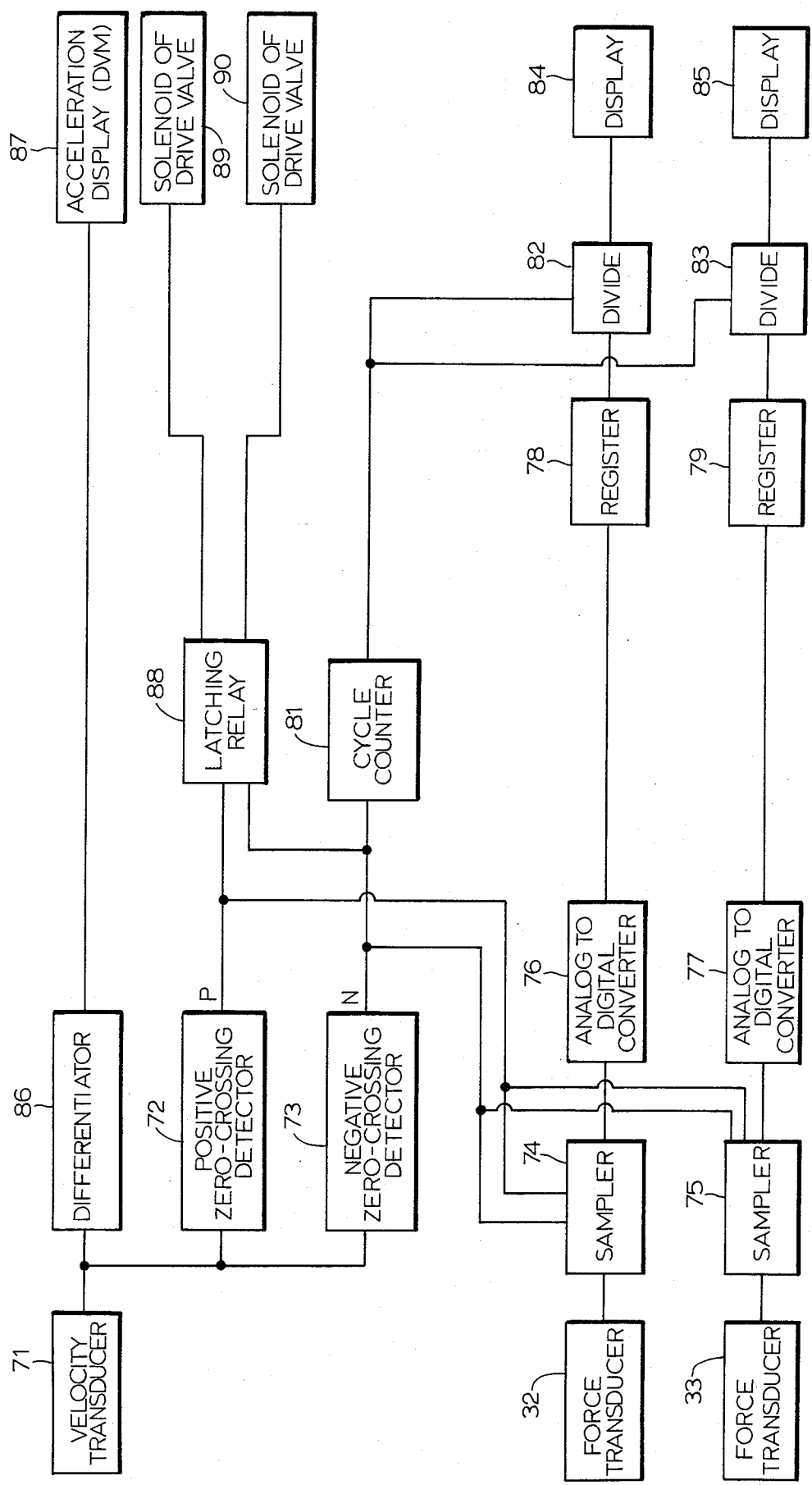
FIG. 4 diagrammatically illustrates the electronic system for the balancer of the present invention.

Struts 23, 24, 26 and 27 are preferably single steel bars and, in the embodiment being described, are about 15 inches long and about 1 inch in diameter. Struts 28 and 29, the links, are each in two pieces to support force transducers 32 and 33 therebetween. These transducers conveniently have threaded holes on either end to receive the ends of the strut pieces. The outer ends of links 28 and 29 are actually bolted to a support structure 35 which is rigidly attached to and forms part of the base 21. In this embodiment, the force-sensing means 32 and 33 are connected with electronic circuitry, as shown in FIG. 4, to provide detecting means for torques and forces that may be imposed on struts 28 and 29.

Cradle 22 essentially comprises a hollow cylinder and supports a circular table 34 which, in turn, is adapted to carry the object 36 to be tested. In particular, with reference to FIGS. 2 and 3, which are partial cross-sectional views of the cradle and turntable obtained by cutting the cradle and turntable in the YZ and XZ planes, respectively, the table 34 is designed to ride on a turntable bearing structure, generally designated by reference number 41, and is coupled to the cradle by a torsion rod, or driving means, 42 sized to tune the oscillation of the test object to a chosen frequency, preferably between about 0.2 and 1.0 hz. The table 34 and bearing structure 41, thus, define a support means for movement of an object to be balanced about a vertically maintained axis. In practice, it is desirable to provide a series of torsion rods each having a different spring constant which can be selectively inserted into the system to tune the oscillation to the optimum value for the particular test object being balanced, as explained further below. In the preferred embodiment, the torsion rod will be about 15 inches long and 2.0 inches thick, and will have a width of from about 0.6 inch to about 2.0 inches, depending on the spring constant desired.

The table 34 is provided with a hub portion 43 from which, on suitable bearings, hangs a drive hub 44. The two hubs are locked together by a keying sleeve 46 which is held in position by a spring 47. Any appropriate shift mechanism, illustrated schematically by box 48 in FIG. 3 can be provided to move the sleeve 46 downward against the force of the spring 47 to unlock the hubs 43 and 44 from one another. This will permit the table to be uncoupled from the drive mechanism to enable the table to be rotated to any desired orientation and then recoupled. The reason for this capability will be explained hereinafter.

The shift mechanism 48 could be of any conventional type and need not be described in any detail herein. An air cylinder, for example, could be utilized to simply push the sleeve downwardly whenever it is desired to unlock the hubs.

The table itself is driven into oscillation by four air cylinders 49. Specifically, drive hub 44 is provided with a pair of extended drive arms 51 and 52; and opposing pairs of air cylinders, all pushers, are provided to sequentially push against the drive arms to oscillate the drive hub, and, hence, the table coupled to it. The pusher elements 53 are held against the drive arms by springy push pads 54.

To oscillate the drive hub, a first pair of air cylinders is first actuated to push the hub, and hence the table in a clockwise direction; and thereafter, the second set of air cylinders is actuated to push the hub back in a counter-clockwise direction. The air cylinders thus control the amplitude of the oscillation while the oscillation frequency is a function of the moment of inertia of the test object and the spring constant of the selected torsion rod. Conventional solenoid valves, coupled to an air supply, may be used to control the air cylinders. Obviously, if desired, other kinds of systems may also be used to drive the table into oscillation.

The operation of the system of FIGS. 1–3 will now be explained with particular reference to FIG. 4 which schematically illustrates the means for indicating any imbalance in a test object.

Initially a torsion rod that will oscillate the test object at the desired frequency is chosen and installed. Selection of the proper torsion rod will depend on the stiffness of the spacecraft or other object being tested and it is desirable to select a torsion rod which will provide an oscillation frequency at which the test object will be fairly rigid; i.e., have no resonances. The desired amplitude of oscillation is then selected and the peak acceleration that goes with the desired amplitude is calculated.

The test object is then placed on the table 34. The table is unlocked from the drive mechanism and rotated to align the $+X'$ axis of the test object with the $+X$ axis of the machine, as is illustrated in FIG. 1. The table is then locked in place to the drive mechanism. The drive mechanism is then turned on to drive the table into oscillation about the Z-axis and the peak acceleration is adjusted to the selected value. Measurement can then be initiated by pressing an appropriate "start" button.

As discussed previously, force transducers 32 and 33 are mounted to the links 28 and 29, respectively, to measure the forces exerted on the links. These transducers are also shown in schematic form in FIG. 4. The output of each transducer will consist of a constant term, a sinusoid at oscillation frequency, lesser sinusoids at harmonics of the oscillation frequency, 60 and 120 hz noise and random noise. The sinusoid at oscillation frequency has a component that is in phase with the angular acceleration of the table and that is the component to be measured with all other outputs of the transducers to be ignored in the measurements.

The oscillating table also drives a velocity transducer 71, the output of which feeds a positive zero-crossing detector 72 and a negative zero-crossing detector 73. The positive zero crossing detector puts out a timing pulse P at each positive going zero crossing of the velocity of the oscillating table (at the instant when the table excursion is at its negative peak and the angular acceleration is at its positive peak) and negative zero crossing detector 73 puts out a timing pulse N at each negative going zero crossing (at the instant when the table excursion is at its positive peak and the angular acceleration is at its negative peak).

Figure 2:
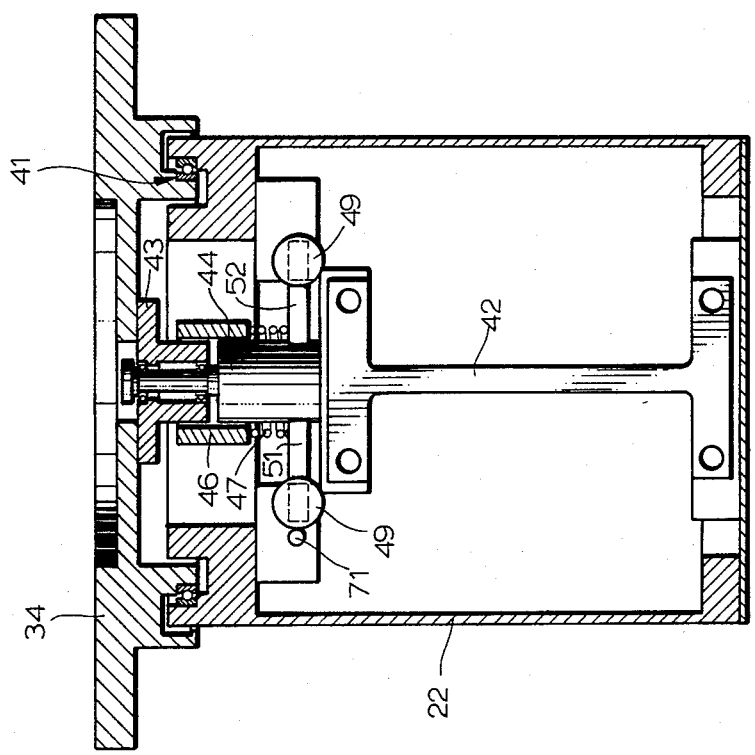

As shown in FIGS. 2 and 3, the velocity detector is supported within the cradle and its movable element is coupled to drive arm 51.

At each P pulse, the output of force transducers 32 and 33 are sampled by samplers 74 and 75, respectively, digitized in analog-to-digital convertors 76 and 77, respectively, and summed into registers 78 and 79, respectively. At each N pulse, the force transducer outputs are similarly sampled, digitized and their negatives summed into registers 78 and 79.

A cycle counter 81 is also coupled to the output of the negative zero crossing detector and counts the number of cycles of the oscillating table since the start of the measurement. This counter controls a pair of dividers 82 and 83 which are coupled to the outputs of registers 78 and 79, respectively, and the outputs of the dividers are coupled to suitable displays 84 and 85. These displays, updated once per cycle, thus show the contents of registers 78 and 79 divided by the number of cycles of oscillation since the start of the measurement.

The output of velocity transducer 71 is also fed to a differentiator 86 which, in turn, drives a display 87 of peak acceleration. This display is used to adjust the oscillation amplitude of the table and, in addition, to calculate the sensitivity of the imbalance measurements.

The outputs of the zero-crossing detectors 72 and 73 are also connected to a latching relay 88 which can be used to actuate solenoid valves 89 and 90 to actuate the air cylinders 49 of the table drive mechanism to drive the table into oscillation.

It should be apparent that the above-described sampling method will ignore the constant term, the out-of-phase component of the fundamental, and all even harmonics (since measurements are only made at velocity zero crossing points). Thus, displays 84 and 85 will show a running average of the peak-to-peak value of the desired component plus noise (possibly additionally contaminated with odd harmonics). As cycles accumulate, however, the noise will average to zero and the display readings will steady.

Thus, the readings on displays 84 and 85 will give the desired component of the force in each of the links 28 and 29, respectively, for the orientation of the object under test illustrated in FIG. 1. These readings should be recorded as the forces on links 28 and 29 at orientation $+X'$.

The table is then unlocked from the drive mechanism, turned to align a different axis, e.g., the $+Y'$ axis of the test object with the $+X$ axis of the balancing machine, and then relocked. The drive mechanism is again turned on and the process repeated to measure the new forces on links 28 and 29. These forces should be recorded as the forces on links 28 and 29 at orientation $+Y'$.

In a similar fashion, the forces on links 28 and 29 at orientations $-X'$ and $-Y'$ are also measured and recorded.

From these readings, the ballast needed to correct the balance of the test object can be calculated as will be explained in detail hereinafter.

Preferably, after the necessary ballast is added (the term ballast as used herein may be positive or negative), the entire process should then be repeated to ensure that the balance is sufficiently correct.

Although the balancing system according to the present invention has now been fully described and its operation explained in detail, it is believed that a better understanding of the invention can be achieved by providing a general explanation of how imperfect balance in an oscillating object will cause effects that can be used to accurately detect and measure the imbalance. This explanation will be made with reference to FIG. 5 which schematically illustrates the balancing machine 20 of the present invention supporting a cylinder 91 on its table 34. Let us assume that the various struts 23, 24, 26, 27, 28 and 29 are oriented as described previously with reference to a three-dimensional XYZ coordinate system, and let us further assume that the origin of the XYZ system is at a height midway between the two force links 28 and 29 and that the cylinder 91 in and of itself represents a perfectly balanced spacecraft.

Let us now suppose that the cradle 22 is pushed with a force F along the Y axis. For equilibrium, the links 28 and 29 must counteract that force with forces $f_1 = f_2 = -\frac{1}{2}F$. If the cradle is pushed along the X or the Z axis, the links will feel nothing (because, as indicated previously, they are stiff along their length and very soft in other directions).

Figure 5:
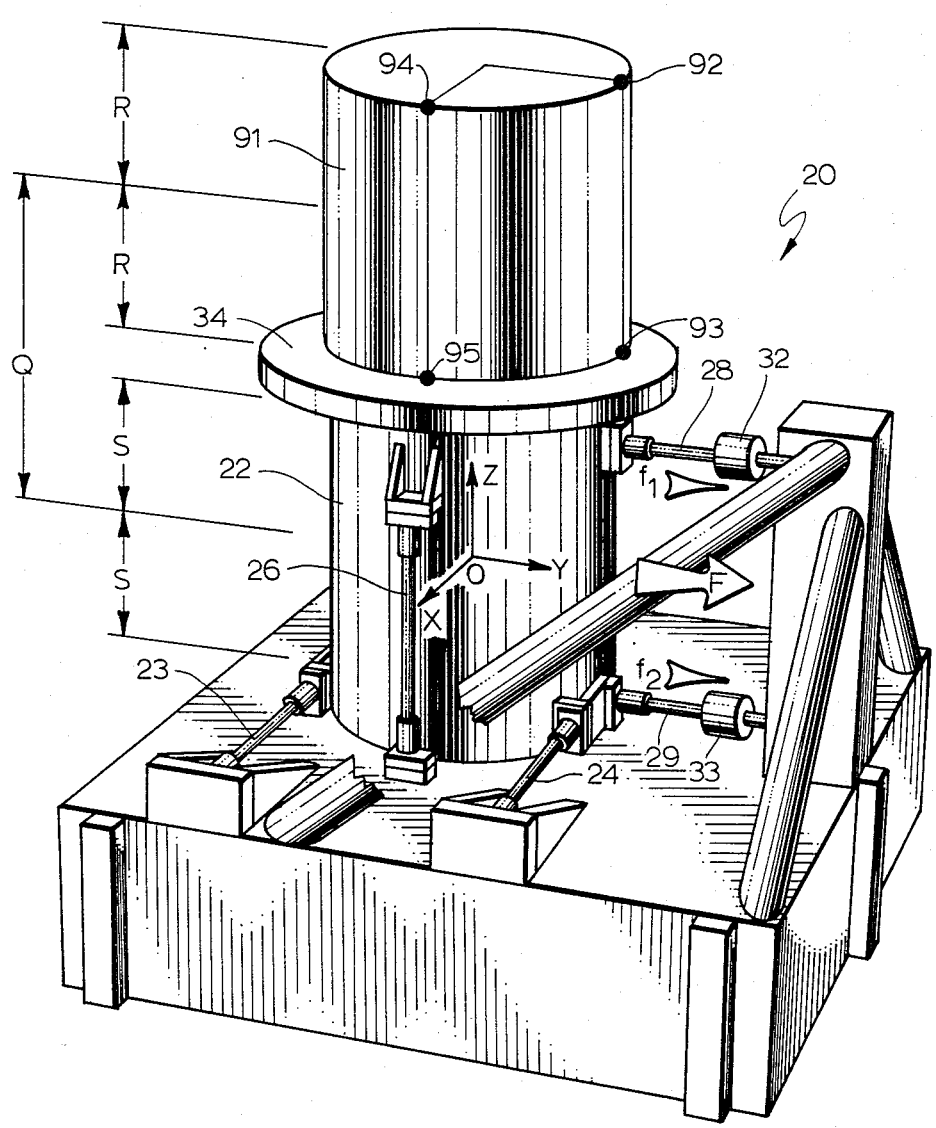
FIG. 5 is a schematic illustration of the balancing machine of the present invention to help explain how the invention is effective in detecting and measuring imbalance in an object.

Suppose that a torque L is exerted along the X-axis (that is, the cradle is twisted in the direction that would advance a right-handed screw in the X-direction). The links 28 and 29 must counteract that torque with the forces $$f_1 = L/2S \text{ and } f_2 = -L/2S$$

where S equals one-half the distance between the two links or, in other words, the distance between the Y-axis and each of the links (see FIG. 5). If a torque is exerted along the Y or Z axis the links will again feel nothing.

Now suppose that the spacecraft (represented by cylinder 61) is caused to oscillate about the Z-axis with a frequency w and an amplitude A. Its angular deflection is then $\theta = A \sin wt$, its angular velocity will be $\dot{\theta} = Aw \cos wt$, and its angular acceleration is $\ddot{\theta} = -Aw^2 \sin wt$. Because we are assuming that the spacecraft is perfectly balanced about the Z axis, the links will feel nothing.

Let us now intentionally throw the "spacecraft" out of balance. This can be done by attaching four lumps 92, 93, 94, and 95 to the cylinder as shown in FIG. 5. The lumps may have any desired mass, either positive or negative; but their position is as shown in FIG. 5 with lumps 92 and 93 being in the YZ plane at the top and bottom of the cylinder and lumps 94 and 95 being in the XZ plane also at the top and bottom of the cylinder. By properly assigning the correct mass to each of the four lumps, the spacecraft can be given whatever condition of imbalance is desired. In other words, any rigid object can be represented as a perfectly balanced cylinder with lumps added at the four places shown; and if the mass of the four lumps is known, it can readily be determined what is necessary to bring the object into balance. The job of balancing the spacecraft (or any other rigid object) thus can be reduced to simply deducing the masses of the four lumps from the forces measured by the force links via force transducers 32 and 33.

When this now unbalanced spacecraft oscillates, it will by reaction to acceleration, gravity, and windage exert forces and torques on the cradle in all directions and at many frequencies and phases. But, as pointed out previously, the mechanical strut arrangement causes the measuring system to ignore all forces except for those in the Y direction and all torques except for those in the X direction. The detecting means of FIG. 4 was designed to cause the measuring system to ignore all forces and torques except for those sinusoidal ones that are at the drive frequency and in phase with the displacement. So let us analyze the effect of each lump on the in-phase output of each of the two links.

First, let us consider lump 92. Its oscillation on a circular arc can be expressed as the sum of an X motion at drive frequency (and harmonics) and a tiny Y motion at twice the drive frequency (and harmonics). All effects of the Y motion will be ignored by the measuring system because it is not at the drive frequency. Similarly, the effects of the X harmonics will be ignored. Only the component of the X motion at the drive frequency counts.

The lump will also exert a Z force because of gravity. That direct force is ignored by the system because of both frequency and direction, and the steady X torque that it causes will be ignored because of frequency. Because of X motion, the Z force also causes a Y torque at the drive frequency that will be ignored because of direction.

The lump 92 also exerts an X force at drive frequency as a reaction to its X acceleration. This force, being offset from the origin, exerts both Y and Z torques. This force and its torques are all ignored, however, because of direction.

If the lump has any aerodynamic drag, the X motion will cause an out-of-phase X force at drive frequency. This force, being offset from the origin, exerts both Y and Z torques. These are also all ignored because of direction and because of phase.

If the aerodynamic drag coefficient is different in the two directions (as is common), the effect is simply to add a bias force to the sinusoidal force. Its effects will also be ignored because of direction and frequency.

Finally, if the lump has aerodynamic lift with the same coefficient in both directions, it will exert a Z force at twice the drive frequency. This causes an X torque that is ignored because of frequency. If the lump has aerodynamic lift with different coefficients in the two directions (as is common), it exerts an out-of-phase Z force at drive frequency. This force is ignored because of direction and phase, but it causes an X torque that is ignored only because of phase.

So, in summary, lump 92 will cause no in-phase output of the transducers 32 and 33, and the same analysis will apply to lump 93. With the spacecraft in the orientation of FIG. 5, therefore, any imbalance that exists in the Y direction due to lumps 92 and 93 will not be detected.

Now let us consider lump 94. For this lump, all effects of its tiny X motion can be ignored because it will not be at the drive frequency, so we need think about only the Y motion. Because of gravity, this lump exerts a Z force of $-m_1 g$ where $m_1$ is the mass of lump 94. That direct force is ignored because of direction and frequency, and the steady Y torque caused by its X offset is also ignored because of both direction and frequency. But its varying Y offset causes an in-phase X torque proportional to its mass and its displacement from the X axis.

$$L = -m_1 g a \theta = -m_1 g a A \sin wt.$$

The force links must counteract this torque so $$f_1 = -f_2 = -\frac{m_1 gaA}{2s} \sin wt.$$

The lump also exerts a Y force at the drive frequency as a reaction to its Y acceleration.

$$F = -m_1 a\ddot{\theta} = m_1 aAw^2 \sin wt.$$

The force links will counteract the force with $$f_1 = f_2 = -\tfrac{1}{2} m_1 aAw^2 \sin wt.$$

This Y force, being offset from the origin also causes Z and X torques. The Z torque is ignored because of direction. The X torque is $$L = -(Q+R)F = -(Q+R) m_1 aAw^2 \sin wt.$$

where R equals ½ the height of the spacecraft and Q equals the distance from the center of the spacecraft to the center of the cradle. The force links counteract this torque with $$f_1 = -f_2 = -\frac{Q+R}{2S} m_1 aAw^2 \sin wt.$$

If the lump has aerodynamic drag, the Y motion will cause an out-of-phase Y force at the drive frequency. This force, being offset from the origin, causes both X and Z torques. The Z torque is ignored because of phase and direction. The Y force and X torque are ignored because of phase.

If the drag coefficient is different for motion in the two directions, a bias force in the Y direction is added. It and its offset torques are ignored because of frequency. If the lump has aerodynamic lift with the same coefficient in both directions, it exerts a Z force at twice drive frequency. This causes a Y torque that is ignored because of direction and frequency.

If the lump has different lift coefficients in the two directions (as is common), it exerts an out-of-phase Z force at drive frequency. This force and the Y torque due to its offset are ignored because of phase and direction.

In summary, therefore, the sum of the various effects of lump 94 is as follows:

$$f_1 = -\frac{m_1 aA}{2S} [(Q + R + S)w^2 + g]\sin wt.$$

$$f_2 = \frac{m_1 aA}{2S} [(Q + R - S)w^2 + g]\sin wt.$$

Similarly, we would find that the sum of the various effects of lump 95 would be (where $m_2$ is the mass of lump 95)

$$f_1 = -\frac{m_2 aA}{2S} [(Q - R + S)w^2 + g]\sin wt.$$

$$f_2 = \frac{m_2 aA}{2S} [(Q - R - s)w^2 + g]\sin wt.$$

The amplitude of the total in-phase force at upper force link 28 is $$f_1 = -\frac{aA}{2S} \{[(Q+R+S)w^2 + g]m_1 + [(Q-R+S)w^2 + g]m_2\}$$

and the amplitude of the total in-phase force at the lower force link 29 is $$f_2 = \frac{aA}{2S} \{[(Q+R-S)w^2 + g]m_1 + [(Q-R-S)w^2 + g]m_2\}$$

Solving for $m_1$ and $m_2$, we get $$m_1 = \frac{(Q - R - S + g/w^2)f_1 + (Q - R + S + g/w^2)f_2}{2aRAw^2}$$

$$m_2 = -\frac{(Q + R - s + g/w^2)f_1 + (Q + R + S + g/w^2)f_2}{2aRAw^2}$$

The machine measures $f_1$ and $f_2$, and all the rest are known parameters, so we can readily calculate $m_1$ and $m_2$. It should be remembered that these are fictitious lumps that represent any actual X imbalance, so their negatives are the required correction ballast.

If we rotate the spacecraft 90 degrees relative to the machine, we can similarly find the ballast to correct the Y imbalance; that is, an imbalance that can be represented by lumps 92 and 93.

Now, looking at only the X (or only the Y) components, the static and dynamic imbalance can be calculated as follows:

$$\text{Stat} = a(m_1 + m_2) = -\frac{f_1 + f_2}{Aw^2}$$

$$\text{Dyn} = aR(m_1 - m_2) = \frac{(Q - S + g/w^2)f_1 + (Q + S + g/w^2)f_2}{Aw^2}$$

The preferred embodiment of the invention provides a support means for movement of an object to be balanced about a vertically maintained axis, a means for oscillating said support means about that axis, force-sensing means coupled to said support means at two spaced points on that axis to detect forces acting at the two spaced points as a result of an imbalance in an object carried by said support means, and means to indicate any such imbalance sensed by the force-sensing means.

While what has described constitutes a presently preferred embodiment of the invention, it should be recognized that the invention may take many other forms. For example, electro-magnets or other means may be used, in place of the air cylinders to drive the table into oscillation. Similarly, the electronic circuitry may be varied in many ways. These and other changes can be made without departing from the spirit and scope of the invention and without diminishing its attendant advantages. It is, therefore, intended that such changes and modifications be covered by the following claims.

I claim:

1. Apparatus for detecting imbalance in an object comprising:
   first means for supporting said object;
   second means for supporting said first means;
   a base for supporting said second means;
   a plurality of strut means coupling said second means to said base, said plurality of strut means including first strut means for holding said second means against translation in the direction of a vertical axis and against rotation about a first horizontal axis, second strut means for holding said second means against translation in the direction of a second horizontal axis and against rotation about the vertical axis, and third strut means for holding said second means against translation in the direction of said first horizontal axis and against rotation about said second horizontal axis;

means for angularly oscillating said first means and said object supported thereby relative to said second means;

detecting means coupled to said third strut means for detecting reaction forces exerted in the direction of said first horizontal axis and reaction torques exerted around said second horizontal axis as a result of effects caused by imbalance in said object; and means for uncoupling said first means from said second means for rotating said first means and said object supported thereby to different orientations relative to said second means to enable all horizontal reaction torques and forces to be detected.

2. Apparatus as recited in claim 1 wherein said oscillating means includes torsion means coupling said first means to said second means.

3. Apparatus as recited in claim 2 wherein said oscillating means further includes drive means for driving said first means and said object supported thereby into angular oscillation.

4. Apparatus as recited in claim 3 wherein said drive means includes means for angularly oscillating said first means and said object supported thereby at an amplitude of from about 0.01 radians to about 0.06 radians.

5. Apparatus as recited in claim 3 wherein said torsion means is selected to angularly oscillate said first means and said object supported thereby at a frequency of from about 0.2 hertz to about 1.0 hertz.

6. The apparatus of claim 2 wherein said torsion means includes a torsion rod centered on the vertical axis and adapted to generate a chosen frequency of oscillation and wherein said oscillating means further includes drive means for oscillating the torsion rod about the vertical axis with a chosen amplitude.

7. Apparatus as recited in claim 1 wherein said detecting means includes force transducer means mounted to said third strut means and circuit means coupled to said force transducer means, said circuit means including means for generating an output which is a measure of substantially only those reaction torques and forces detected by said force transducer means which are in-phase with the angular acceleration of the object.

8. Apparatus as recited in claim 7 wherein each of said strut means comprises a pair of struts and wherein said detecting means includes force transducer means mounted to each of said third strut means.

9. Apparatus as recited in claim 7 wherein said circuit means includes means for sampling the outputs of said force transducer means each time the oscillation of said object is at a peak, means for summing said sampled outputs, and means for dividing said summed outputs by the total number of cycles of said oscillation for producing a resultant signal, and display means for displaying said resultant signal, said display representing a measure of the imbalance of said object.

10. Apparatus for detecting imbalance in an object comprising:

first means for supporting said object;

cradle means for supporting said first means and said object supported thereby;

means for angularly oscillating said first means relative to said cradle means, said oscillating means including torsion means coupling said first means to said cradle means;

drive means for driving said first means and said object supported thereby into angular oscillation about a vertical axis;

base means for supporting said cradle means;

coupling means for coupling said cradle means to said base means, said coupling means including means for constraining said cradle means against movement in substantially all directions;

transducer means coupled to said coupling means for detecting the reaction torque and force exerted thereagainst by said cradle means as a result of effects excited in said cradle means by any imbalance in said object; and means coupled to said transducer means for indicating that portion of said transducer means output which is in phase with the angular acceleration of said first means, the magnitude of said portion being a measure of the imbalance in said object.

11. Apparatus as recited in claim 10 wherein said object comprises a spacecraft.

12. Apparatus as recited in claim 10 wherein said coupling means includes a plurality of strut means, said plurality of strut means together being positioned to stiffly constrain said cradle means against movement in substantially all directions.

13. Apparatus as recited in claim 12 wherein said plurality of strut means comprise three strut means including first strut means for holding said cradle means against translation in the direction of a vertical axis and against rotation about a first horizontal axis, second strut means for holding said cradle means against translation in the direction of a second horizontal axis and against rotation about the vertical axis, and third strut means for holding said cradle means against translation in the direction of said first horizontal axis and against rotation about said second horizontal axis and wherein said transducer means is coupled to said third strut means.

* * * * *